United States Patent [19]

Tammaru, Tarmo

[11] 3,950,616
[45] Apr. 13, 1976

[54] ALIGNMENT OF BYTES IN A DIGITAL DATA BIT STREAM

[75] Inventor: Tammaru, Tarmo, Middletown, N.J.
[73] Assignee: Bell Telephone Laboratories, Incorporated, Murray Hill, N.J.
[22] Filed: Apr. 8, 1975
[21] Appl. No.: 566,609

[52] U.S. Cl. .............................. 178/69.5 R; 178/22
[51] Int. Cl.² ............................................ H04L 7/08
[58] Field of Search .................. 178/68, 69.5 R, 22; 179/15 BS, 15 BY; 325/32, 58

[56] References Cited
UNITED STATES PATENTS

| | | | |
|---|---|---|---|
| 3,515,805 | 6/1970 | Fracassi et al. ......................... | 178/22 |
| 3,560,660 | 2/1971 | Poretti et al. .......................... | 179/15 |
| 3,619,510 | 11/1971 | Zegers et al. ..................... | 179/15 AP |
| 3,646,272 | 2/1972 | Kay................................. | 179/15 AP |
| 3,792,201 | 2/1974 | Osborne ......................... | 179/15 BS |
| 3,794,768 | 2/1974 | Carney et al. .................. | 179/15 BA |
| 3,809,817 | 5/1974 | Gill et al. ........................ | 179/15 BS |
| 3,825,899 | 7/1974 | Haeberle et al. ............. | 179/15 BS X |
| 3,881,065 | 4/1975 | Queffeulou...................... | 179/15 BS |

OTHER PUBLICATIONS

Bell System Technical Journal; Vol. 51, pp. 1641–1657, Oct., 1972, "System Aspects", H. H. Henning and J. W. Pann.

Primary Examiner—Benedict V. Safourek
Attorney, Agent, or Firm—Roy C. Lipton

[57] ABSTRACT

A sequence of data bytes, which includes a low signaling rate control signal inserted in the framing bit position of each byte, is prepared for transmission by scrambling the information bits while maintaining the framing bit position unscrambled. Pairs of bits occupying a corresponding bit position in different bytes are compared at the receiver and comparison mismatches are counted. The framing bit position is identified by bits having a rate of change in their binary condition which does not exceed a predetermined count rate which is in excess of the low signaling rate of the control signal and is less than the anticipated rate of change of the scrambled information bits. The receiver, when aligned with the framing bit position, is enabled to recover the control signal and unscramble the information bits.

10 Claims, 4 Drawing Figures

FRAMING DETECTOR 15

ALIGNMENT OF BYTES IN A DIGITAL DATA BIT STREAM

FIELD OF THE INVENTION

This invention relates to data transmission systems which utilize a signal format comprising a stream of binary data bits and, more particularly, to the insertion and detection of control and framing signals in the data stream.

DESCRIPTION OF THE PRIOR ART

In synchronous transmission systems, information from a data source in the form of multibit data words may be prepared for transmission by assembling the information bits into data bytes. Framing bits, having predetermined binary signal conditions, may be additionally inserted in fixed bit positions of each byte. Finally the data bytes from the source may be interleaved, on a time division basis, with bytes from other sources and transmitted to a remote receiver.

At the remote receiver, corresponding bit positions of the bytes are scanned to detect the framing bits having the predetermined binary signal conditions; the framing bit position is thereby identified to determine the alignment of the bit positions of the bytes; and the successive bytes are thereby recovered to be distributed to various data sinks corresponding to the several data sources.

It is often desirable to transmit housekeeping or control signals along with the data information. Each source, for example, may transmit control signals to indicate whether the source is idle or busy with a call. This control information is advantageously provided by a flag bit, the binary condition thereof designating the busy or idle mode of the source to the remote receiver. These control signals have the common characteristic that their signaling rate is significantly less than the average signaling rate of any one of the data sources.

The control information flag bit may be of course inserted in the bit stream by reserving a corresponding bit position in each byte. This results in reduction of bit positions available for information signaling. Since the signaling rate of the control information is substantially less than the signaling rate of any source (the binary condition of the flag bit would not vary over a period of a plurality of bytes), it has been appreciated that the control information can be inserted in the framing bit positions by using appropriate constraints which permit the framing signal to also be inserted therein. For example, the control signal may be inserted in the framing bit position of alternate bytes. The framing signal is then detected at the receiver by recognizing the predetermined binary signal framing pattern in the remaining ones of the framing bit positions. However, the control information interspersed with the framing signal makes detection more difficult and decreases the reliability of the framing circuitry at the receiver.

It is an object of this invention to increase the reliability of the framing circuitry without requiring any restraints in the insertion of the control signal. It is a more specific object of this invention to render a fixed bit position modulated with low signal rate control information distinguishable from information bits.

SUMMARY OF THE INVENTION

In accordance with the objects of this invention, the transmitter processes a sequence of data bytes, having control information inserted in the framing bit positions without any constraint, by scrambling the information bits while maintaining the bits in the framing bit positions unscrambled, thereby maintaining at all times, a high average rate of change of the binary condition of the information bits. The framing bit position is identified at the receiver by detecting the bits, occupying corresponding bit positions in the bytes, whose binary condition rate of change does not exceed a predetermined rate which is in excess of the low signaling rate of the control signal and is less than the anticipated rate of change of the scrambled bits.

In the illustrative embodiment of this invention, described hereinafter, the receiver compares pairs of bits occupying corresponding bit positions and determines that the predetermined rate is exceeded when a ratio of mismatches to comparisons is exceeded. The receiver then slips a bit position to compare pairs of bits occupying a different one of the corresponding bit positions.

The ratio of mismatches to comparisons is computed by a mismatch counter advanced by each comparison mismatch and a comparison counter advanced each time a bit comparison is made. If the mismatch counter advances to its final count before the comparison counter, the receiver goes to an out-of-frame mode. Alternatively, if the comparison counter advances to its final count before the mismatch counter, the receiver goes to, or is maintained in, an in-frame mode.

When the receiver is in the in-frame mode, a pulse generator, aligned with the bit position being compared, generates a timing pulse train to identify the framing bit position. This enables the receiver to recover the control information and to unscramble the scrambled bits in the other bit positions.

The foregoing and other objects and features of this invention will be more fully understood from the following description of an illustrative embodiment thereof taken in conjunction with the accompanying drawings.

DETAILED DESCRIPTION

Figure 1:
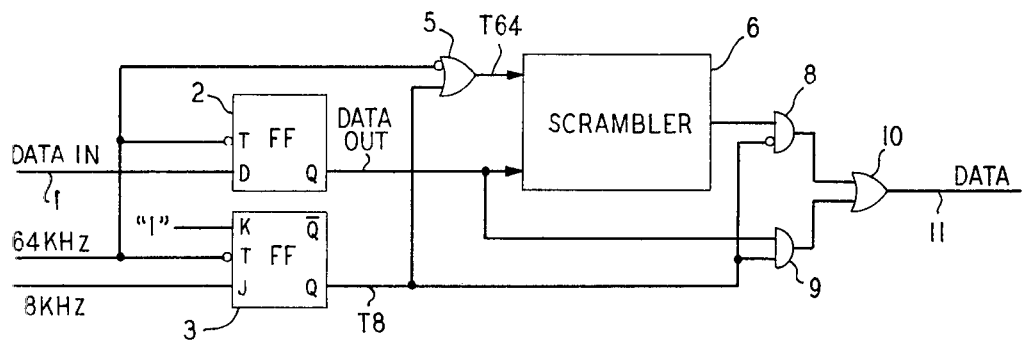
FIG. 1 shows, in schematic form, a transmitter arranged in accordance with this invention.
Figure 3:
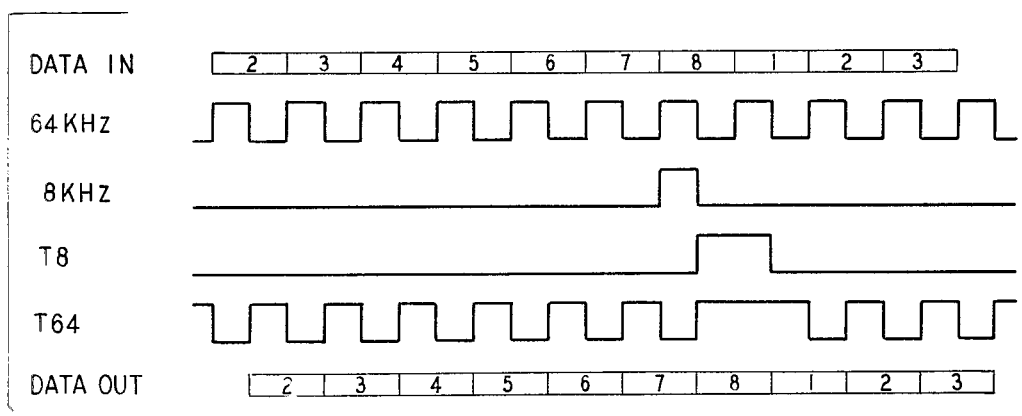
FIG. 3 depicts timing waves produced by data signals and by clocking equipment in the transmitter.

Data for the originating terminal in FIG. 1 is supplied to input lead 1. This data constitutes a train of data bits at a 64 kilobits per second (Kbs) signaling speed. The data format consists of successive 8-bit bytes at the 64 Kbs signaling rate. The 8-bit bytes are therefore supplied at a rate of 8,000 per second. This type of a signaling format is accommodated by two-way cross office paths and trunks in an office of the type described in U.S. Pat. No. 3,794,768 which issued to A. C. Carney, M. P. Cichetti, Jr., J. G. Kneuer and D. W. Rice on Feb. 26, 1974. In the patent, the central office advantageously provides an 8 KHZ office clock for aligning the 8-bit bytes and a 64 KHZ office clock for aligning the bits in the bit stream. The appropriate timing waves for the 8 KHZ clock, the 64 KHZ clock and the data bit stream (DATA IN) are shown in FIG. 3 and are identically shown in FIGS. 4A, 4B and 4C, respectively, of the A. C. Carney et al. patent.

An inspection of FIG. 3 reveals that the leading transition of each 64 KHZ pulse is aligned with the leading transition of each data bit. The leading transition of the KHZ pulse is aligned with the leading transition of the eighth bit of each data byte. As further disclosed in the A. C. Carney et al. patent, each cross office path or trunk accommodates one, five, 10 or 20 data channels, the signaling bytes from each channel being interleaved with other channels to provide, in all events, the 64 Kbs signaling rate of 8-bit bytes. As further disclosed in the A. C. Carney et al. patent, each of the 8-bit bytes are assembled by the office to include six or seven data bits from a remote subscriber and a flag bit inserted by an office channel unit for network control. This network control, for example, may designate whether the originating subscriber is "on-hook" or "off-hook" by providing, for example, a 1 bit to the eighth bit position if the subscriber is "on-hook" and a 0 bit to the eighth bit position if the subscriber is "off-hook." Accordingly, the successive data bytes for any individual subscriber may have random information bits for the first through seventh bit position of each byte and successive 0 bits or 1 bits for the eighth bit position. It is to be appreciated that a subscriber periodically goes from "on-hook" to "off-hook" and then back to "on-hook" whereby the eighth bit condition changes. The change, however, is necessarily at a very low speed signaling rate.

The 64 KHZ timing signal is inversely applied to the toggle inputs of flip-flops 2 and 3 and also inversely applied to OR gate 5. The incoming data bit stream is passed to the D input of flip-flop 2. Flip-flop 2 is toggled by the negative going transition of the 64 KHZ timing signal and placed in the set condition if a 1 bit is being applied to its D input and conversely placed in the clear condition if a O bit is being applied to its D input. Since the toggling of flip-flop 2 is at the termination of each 64 KHZ pulse which, as seen in FIG. 3, occurs at the midpoint of the incoming bit, the output of flip-flop 2 is therefore a reproduction of the incoming data bit stream delayed by a one-half bit interval. In addition, flip-flop 2 provides a small additional output delay whereby the transitions of the data bits slightly lag the transitions of the 64 KHZ timing signal. The data bit stream thus produced is depicted as wave DATA OUT in FIG. 3. This bit stream is applied to scrambler 6 and to AND gate 9.

The 8 KHZ timing wave is passed to the J input of flip-flop 3. A 1 or "high" bit is simultaneously applied to the K input of the flip-flop. The trailing edge of the 64 KHZ timing signal therefore toggles flip-flop 3 to the clear condition in the absence of the 8 KHZ pulse and conversely toggles flip-flop 3 to the set condition in the presence of the 8 KHZ pulse. The Q-output of flip-flop 3 therefore goes high at the midpoint of the eighth bit position of the incoming bit stream and restores at the midpoint of the first bit position, as shown in timing wave T8 in FIG. 3. Accordingly, the T8 pulse is aligned with the eighth bit position of the DATA OUT bit stream.

The T8 pulse is passed to AND gate 9 and also passed, inverted, to AND gate 8. In addition, the T8 wave is combined with the 64 KHZ wave, inverted, by OR gate 5. The output of OR gate 5 accordingly comprises the 64 KHZ wave, inverted, during the first seven bits of each byte of the DATA OUT bit stream and comprises the T8 pulse during the eighth bit of each byte, resulting in the elimination of the pulse during the eighth bit position. The timing wave thus produced is shown as timing wave T64 in FIG. 3. This timing wave together with the DATA OUT bit stream are passed to scrambler 6.

Scrambler 6 comprises a digital machine which remaps data sequences to provide substantially random transitions. A suitable scrambler for this purpose is disclosed in U.S. Pat. No. 3,515,805 which issued to R. D. Fracassi and J. E. Savage on June 2, 1970. As disclosed in the R. D. Fracassi et al. patent, an incoming bit stream is delayed by stages of a shift register which is advanced by a clock signal. A scrambled signal is then constructed by the summations of the delayed data bits. Utilizing the positive transitions of the T64 timing wave as the clock signal, and recalling that the timing wave leads the data bit stream, it will be appreciated that the DATA OUT bit stream is correspondingly scrambled with the exception that since the positive transition of the clock signal during the eighth bit has been deleted, the corresponding eighth data bit is not advanced into the shift register and is therefore not scrambled with the bits from the other bit positions in the manner defined by the R. D. Fracassi et al. patent. The output of scrambler 6 therefore constitutes data bits scrambled in the appropriate manner during the seven bit positions. The resultant output of the data scrambler 6 during the eighth bit position is to be ignored, as described hereinafter.

The output of scrambler 6 is connected to AND gate 8. The other input to AND gate 8 comprises the T8 timing wave, inverted. Accordingly, AND gate 8 is enabled during the first seven bit positions of each output byte of scrambler 6 and disabled during the eighth bit position. The output of scrambler 6 is therefore passed through AND gate 8 and through OR gate 10 to output lead 11 during the first seven bit positions of each byte.

Timing wave T8 is also applied to AND gate 9, as previously noted. Accordingly, AND gate 9 is enabled during each eighth bit position and disabled during the first seven bit positions. The other input to AND gate 9 is connected to the output of flip-flop 2. The delayed DATA OUT bit stream derived from flip-flop 2 is thus applied to AND gate 9 and, since the AND gate is enabled during the eighth bit position, the eighth or flag bit is passed therethrough and through OR gate 10 to output lead 11. Accordingly, the bit stream on output lead 11 constitutes the scrambled data bit output of scrambler 6 during the first seven bit positions of each byte and constitutes the unscrambled eighth bit of each byte. It is therefore to be appreciated that the conditions of the first seven bits of successive bytes from any subscriber is substantially random due to the scrambling whereas the condition of the eighth bit of the successive bytes changes at the low signaling rate, since the bit is the unscrambled flag bit for the data bytes. Thus, on lead 11, the flag bit condition changes at a very low rate, since the bit is unscrambled and the conditions of the other bits change at a relatively high rate since they are scrambled.

The data on output lead 11 is advantageously transmitted to a remote office. Conventionally, where the remote office is a significant distance away, a data modem may be provided to modulate the data stream and thereby enable transmission over great distances.

Figure 2:
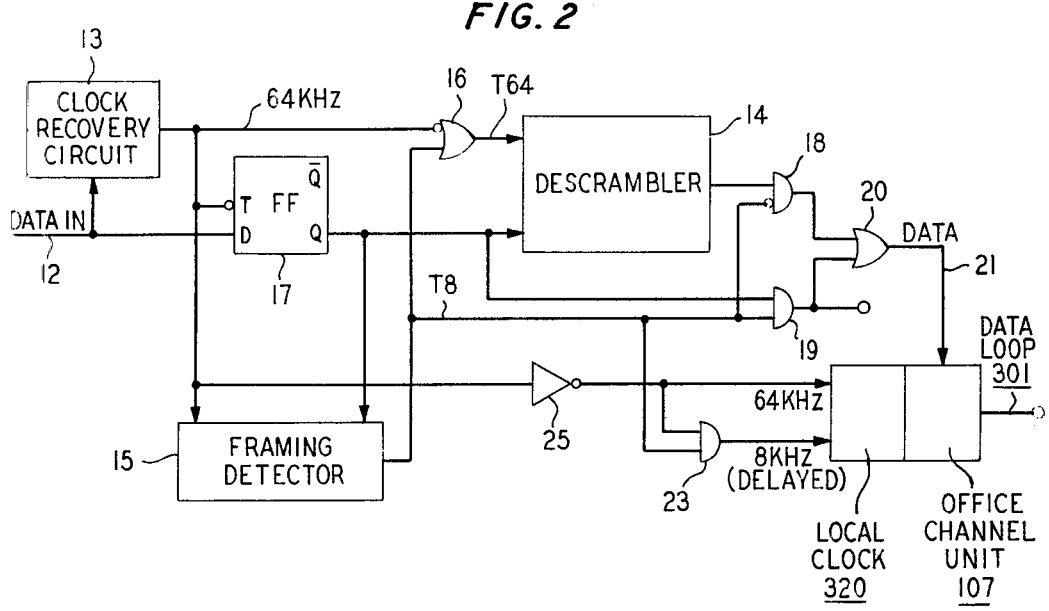
FIG. 2 shows, in schematic form, a receiver arranged in accordance with this invention.

At the remote office therefore a data modem is also provided to recover the baseband signal in the same form as on output lead 11. It is, of course, appreciated that for short distances the baseband signal itself can be applied to the transmission line and sent on to the remote office. In either event, the baseband data bit stream is recovered by the remote office and this bit stream is applied to the terminating terminal shown in FIG. 2. More specifically, the recovered bit stream is applied to input lead 12 and is passed to clock recovery circuit 13, framing detector 15, descrambler 14 and AND gate 19.

Clock recovery circuit 13 recovers the 64 KHZ timing wave from the transitions in the data bit stream on lead 12. A conventional phase-locked loop may be advantageously utilized and the loop, locked in phase with the incoming data bit stream, provides at its output a 64 KHZ timing wave. This timing wave, inverted, toggles flip-flop 17 with the incoming data bit stream applied to the D-input of the flip-flop. The flip-flop operation is therefore the same as flip-flop 2 (FIG. 1), providing at output Q a reproduction of the incoming bit stream delayed by a one-half bit interval plus a small additional delay so that the data bit transitions lag the 64 KHZ timing wave transitions.

Framing detector 15 examines the incoming data bit stream on lead 12 and, more particularly, examines the eighth bit of bytes derived from a subscriber which, as previously described, may be interleaved with other subscribers. As described in detail hereinafter, framing detector 15 provides a pulse train output at an 8 KHZ rate identical to timing wave T8 when it locates the eighth or flag bit. As described hereinafter, framing detector 15 identifies the flag bit as the bit whose signaling rate does not exceed a rate which is less than the anticipated high signaling rate of the scrambled bits. The T8 timing wave output of framing detector 15 is then passed to OR gate 16 and AND gate 19 and inversely passed to AND gate 18.

OR gate 16 combines the 64 KHZ timing wave, inverted, as derived from clock recovery circuit 13 and the T8 timing wave derived from framing detector 15. The resultant timing wave output of OR gate 16 is therefore identical to the previously described T64 timing wave generated in the originating terminal. The T64 timing wave provides the clock signals for descrambler 14.

Figure 4:
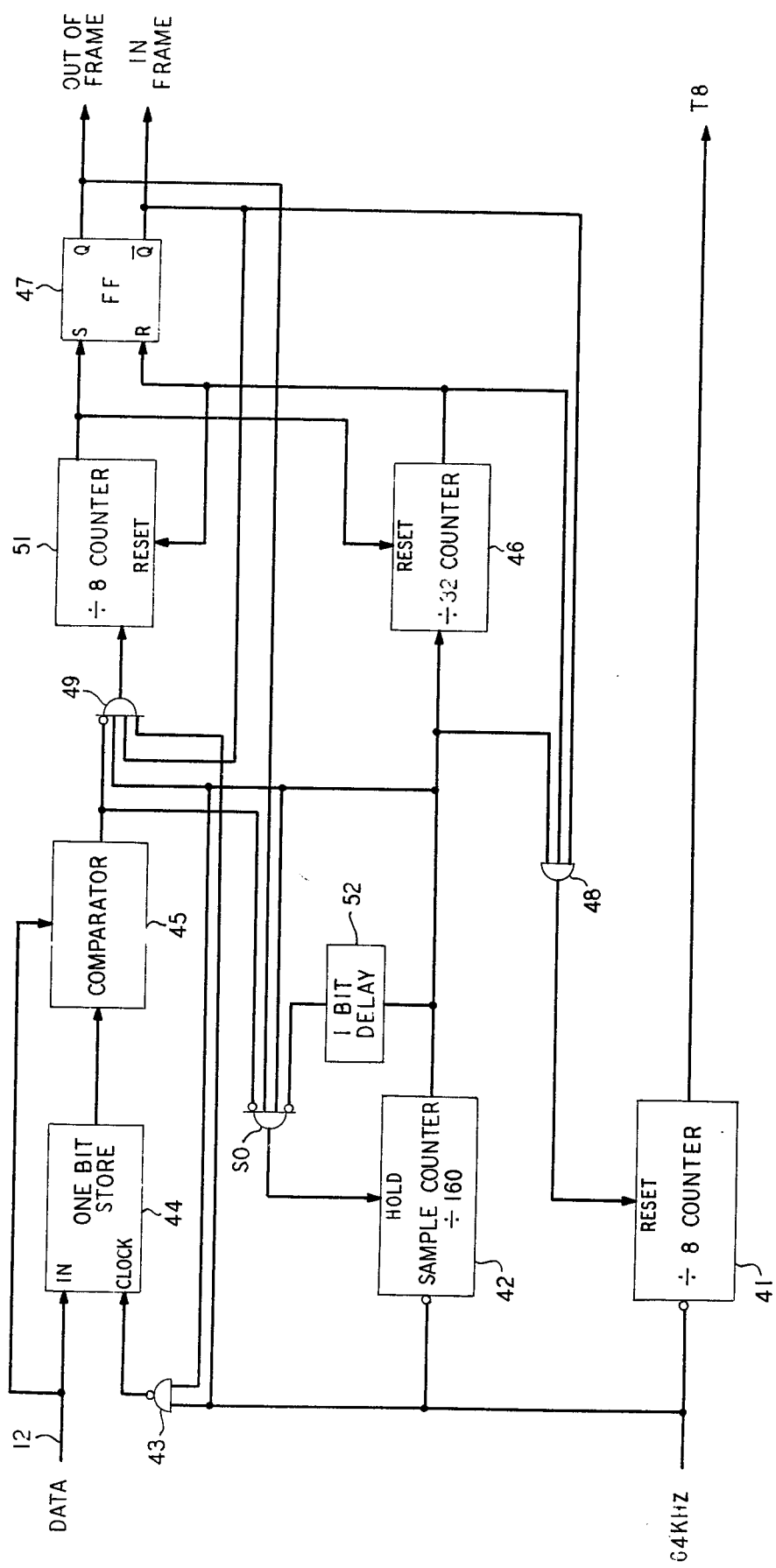
FIG. 4 discloses, in schematic form, the details of circuitry and equipment for a framing detector used in the receiver.

Descrambler 14 is advantageously of the type shown in FIG. 4 of the R. D. Fracassi et al. patent. The descrambler provides an inverse operation with respect to the scrambler delaying the incoming bit stream on lead 12 and subtracting delayed bits to recover the original unscrambled bit stream. It must be appreciated that this operation occurs during the first seven bit intervals of the data byte since the T64 timing wave does not have a transition during the eighth bit interval. The eighth data bit is therefore ignored by the descrambler operation and the output of descrambler 14 comprises a descrambling of the first seven bits of each byte.

The output of descrambler 14 is passed to AND gate 18. As previously noted, the T8 timing wave output of framing detector 15 is applied inversely to AND gate 18. AND gate 18 therefore samples the output of descrambler 14 during the first seven bit positions of the data byte. The bits descrambled by descrambler 14 during the first seven bit positions are therefore passed through AND gate 18 and OR gate 20 to output lead 21. During the eighth bit position, the T8 timing wave disables AND gate 18 and the output of descrambler 14 is thus blocked.

It was previously noted that the T8 timing wave is applied to AND gate 19 which samples the data bit stream on lead 12. AND gate 19 is therefore disabled during the first seven bit positions of each byte and enabled during the eighth bit position. The output of gate 19 therefore comprises the unscrambled eighth or flag bits of the successive bytes.

The unscrambled flag bits are applied through OR gate 20 to output lead 21. Accordingly, the resultant bit stream on output lead 21 constitutes the reconstructed bit stream originally applied on lead 1 to the originating terminal. In addition, the terminating terminal has also derived from the bit stream a 64 KHZ timing wave. This wave, inverted by inverter 25 and the T8 wave may be applied to an AND gate such as gate 23 to derive an 8 KHZ byte clock wave aligned with the eighth bit of each data byte on lead 21. With the data stream, the bit clock and the byte clock available, the bit stream may be processed in the several ways described in the A. C. Carney et al. patent. For example, as shown in FIG. 3 of the patent, the several clock signals may be applied to a local clock identified as clock 320 and the bit stream applied to an office channel unit identified as unit 107 to recover and apply to data loop 301 the data stream originally sent by the sending data subscriber.

The 64 KHZ timing signal, inverted, is normally divided down by framing detector 15 to provide the T8 timing signal which is at the 8 KHZ rate. As seen in FIG. 4, the 64 KHZ signal is inversely applied to counter 41. counter 41, which is a divide-by-8 counter, provides an output pulse at each eighth count of the negative transitions of the 64 KHZ wave and, more particularly, provides an output pulse each time counter 41 achieves the initial count of zero. This output pulse is passed to lead T8 to provide the previously described T8 signal. As disclosed hereinafter, it is the function of other circuitry in framing detector 15 to align the initial count of counter 41 with the flag or eighth bit of each byte. In the event, however, that the counter does not remain so aligned, a resetting of the counter occurs whereby the advancing of the counter is modified to again align the eighth bit position with the initial count of counter 41.

The 64 KHZ timing signal is also inversely applied to sample counter 42. It is previously recalled that the data bit stream may constitute the interleaving of the data bytes of five, 10 or 20 subscribers. The occurrence of the eighth bit of any one subscriber may therefore be separated by 160 (20 × 8) bit positions. Sample counter 42 therefore advantageously comprises a divide-by-160 counter. As described hereinafter, framing detector 15 operates to align the advance of sample counter 42 so that the final count, that is count 159, is substantially aligned with the eighth or flag bit of the one subscriber whose bit is being sampled or observed. Accordingly, when sample counter 42 is in its final (159) count, an output pulse is provided at the output of the counter concurrently with the appearance of the eighth or flag bit on data lead 12.

The output pulse of counter 42 is combined with the 64 KHZ clock signal to partially enable AND gate 49. As described below, gate 49 samples the output of comparator 45 and this sample period normally occurs at the midpoint of the flag bit when the output of counter 42 and the 64 KHZ clock signal are both "high." The output of counter 42 is also combined with the 64 KHZ clock by NAND gate 43. The NAND gate is thus enabled during the terminal half of the flag or eighth bit interval. At the end of this interval, NAND gate 43 becomes disabled resulting in a positive transition in the output of NAND gate 43. This positive transition occurs at the terminal portion of the eighth bit since, as previously noted, the 64 KHZ clock leads the data signal. This positive transition clocks the eighth bit into one-bit store 44.

The output of one-bit store 44 is applied to one input of comparator 45. The other input to comparator 45 is derived from the data bit stream on data lead 12. The output of comparator 45 goes high if there is a comparison match and low if there is a comparison mismatch. This output is passed, inverted, to AND gates 49 and 50, partially enabling these gates if there is a comparison mismatch.

The output of sample counter 42 is also passed to counter 46 which defines a sampling interval during which the number of comparison mismatches is calculated. Counter 46, which is a divide-by-32 counter, is advanced each time counter 42 advances to its final count to sample a flag bit. Thus, after counter 42 has cycled through its counts 32 times, counter 46 advances to its final count of 31 and during this final count provides a positive or high pulse at the output thereof. This high pulse resets flip-flop 47, if it was previously set, resets counter 51, if it previously has been advanced, and partially enables gate 48.

Flip-flop 47, in the reset condition, defines an in-frame condition or mode for framing detector 15. With sample counter 42 in its final count and flip-flop 47 in the reset (in-frame) condition, AND gate 48 is enabled, applying a reset pulse to counter 41. At this time, assuming counter 42 is being advanced in a normal manner and, since the count of counter 42 is a multiple of the count of counter 41, counter 41 is in its initial (zero) count and the reset pulse provides no function. This cycling operation continues so long as framing detector 15 is in the in-frame mode.

Assume now that when counter 42 has advanced to its final count, the incoming flag bit on lead 12 differs from the previous flag bit clocked into store 44. In this event, the output of one-bit store 44 differs from the present bit on data lead 12. Comparator 45 therefore detects a mismatch and provides a low condition to its output. Since counter 42 is advanced to the final count and framing detector 15 is in the in-frame mode, AND gate 49 is enabled and inversely passes the low output of comparator 45 to counter 51 which advances one count.

If the rate of change of the binary condition of the flag bit signal is less than the anticipated random rate of scrambled bits (although at the low speed signaling rate of the control signal), less than seven mismatches will be detected during any 32 count sampling interval defined by counter 46. In this event, when counter 46 advances to its final (31) count, counter 51 is reset to the initial zero count.

In the event, however, that the rate of change of the flag bit signal is sufficiently in excess of the low speed signaling rate that seven mismatches are detected during the 32 sample period defined by counter 46, counter 51 advances to the count of seven before counter 46 advances to the count of 31. In this event, counter 46 is reset and flip-flop 47 is placed in the set condition to define the out-of-frame mode. AND gate 48 is thereupon disabled and counter 41 proceeds to run solely under control of the 64 KHZ timing signal.

Upon the setting of flip-flop 47, its Q output goes high, partially enabling AND gate 50. At this time the output of sample counter 42 is high, further enabling AND gate 50. The output of counter 42 was low during the previous bit count. This low condition, provided with a one bit delay by delay circuit 52, is passed, inverted, to AND gate 50 during the final count of counter 42 thereby further enabling the AND gate. It is recalled that there is a comparison mismatch and AND gate 50 is therefore fully enabled. The AND gate, thus enabled, provides hold clamp to counter 42 precluding its advance in response to the next 64 KHZ clock pulse. The counter output is thus maintained high, gate 43 is maintained enabled, passing the next 64 KHZ clock pulse therethrough, and thus clocking in the next successive bit in the bit stream into one-bit store 44. Counter 42 has thus been restrained to thereby slip one bit position in the bit stream. Since its output is maintained high longer than one bit interval the output of delay circuit 52 now goes high, disabling AND gate 50 to remove the hold clamp. Counter 42 thereupon resumes advancing after slipping the one bit position.

After counter 42 again advances to its final count, a comparison is again made and, if there is another mismatch, counter 42 again slips one bit interval. This process is repeated until a flag bit is located as determined by successive comparison matches. Gate 50 is thereby disabled by the comparison matches and counter 42 is thus realigned with the flag bit. Subsequently counter 46 advances to its final count to reset counter 51, reset flip-flop 47 to the in-frame mode, and with flip-flop 47 reset, AND gate 48 is enabled to reset counter 41. Accordingly, counter 41 is aligned with the flag bit position and a new T8 timing signal, similarly aligned with the flag bit position is provided by framing detector 15.

Although a specific embodiment of this invention has been shown and described, it will be understood that various modifications may be made without departing from the spirit of this invention.

I claim:

1. In a data transmission system including means at a transmitting station for transmitting binary data bits arranged in groups having control bits in a corresponding bit position in each group, control bits in different groups conveying information at a low speed signaling rate and means at a receiving station for identifying the bit position of the control bits, characterized in that the transmitting means includes means for scrambling the data bits while maintaining the bits in the corresponding bit position unscrambled, and the identifying means includes means for detecting rates of change of the binary condition of the bits occupying a corresponding bit position in different groups not exceeding a predetermined rate which is in excess of the low speed signaling rate and less than the anticipated rate of change of the scrambled bits.

2. In a data transmission system, in accordance with claim 1, wherein the identifying means includes means for comparing pairs of bits individually occupying a corresponding one of the bit positions in different groups and means responsive to a ratio of comparison mismatches to pair comparisons for designating the predetermined rate.

3. In a data transmission system, in accordance with claim 2, wherein the identifying means further includes means responsive to the designating means for shifting the comparing means to compare pairs of bits occupying a different corresponding one of the bit positions.

4. In a data transmission system, in accordance with claim 3, wherein the identifying means further includes means for generating a pulse during a corresponding one of the bit positions of each of the groups and means responsive to the comparing means for aligning the generating means with the corresponding one of the bit positions occupied by the compared bits.

5. In a data transmission system, in accordance with claim 4, wherein the designating means includes means for counting pair comparisons, means for counting comparison mismatches and means for defining an out-of-frame condition in response to an advance of the comparison mismatch counting means to a selected mismatch count before an advance of the pair comparison counting means to a selected pair comparison count.

6. In a data transmission system, in accordance with claim 5, wherein the defining means includes means for defining an in-frame condition in response to the advance of the pair comparison counting means to the selected pair comparison count before the advance of the comparison mismatch counting means to the selected mismatch count.

7. In a data transmission system, in accordance with claim 6, wherein the aligning means is enabled by the defining means defining the in-frame condition.

8. In a data transmission system, in accordance with claim 6, wherein the shifting means is enabled by the defining means defining the out-of-frame condition.

9. In a data transmission system, in accordance with claim 4, wherein means at the receiving station repsonsive to the pulse generating means recovers the unscrambled control bits.

10. In a data transmission system, in accordance with claim 4, wherein means at the receiving station responsive to the pulse generating means unscrambles the scrambled data bits.

* * * * *